United States Patent
Marupaduga et al.

(10) Patent No.: US 9,918,321 B1
(45) Date of Patent: Mar. 13, 2018

(54) WIRELESS COMMUNICATION SYSTEM TO OPTIMIZE TRAFFIC MANAGEMENT ON A MULTI-BAND WIRELESS BASE STATION

(71) Applicant: Sprint Communications Company L.P., Overland Park, KS (US)

(72) Inventors: Sreekar Marupaduga, Overland Park, KS (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/471,219

(22) Filed: Mar. 28, 2017

(51) Int. Cl.
*H04W 72/04* (2009.01)
*H04W 24/02* (2009.01)
*H04L 12/26* (2006.01)
*H04B 7/06* (2006.01)
*H04J 11/00* (2006.01)

(52) U.S. Cl.
CPC ...... *H04W 72/0486* (2013.01); *H04B 7/0617* (2013.01); *H04B 7/0632* (2013.01); *H04L 43/16* (2013.01); *H04W 24/02* (2013.01); *H04J 11/00* (2013.01); *H04W 72/0453* (2013.01)

(58) Field of Classification Search
CPC ............. H04W 72/0486; H04W 24/02; H04W 72/0453; H04B 7/0617; H04B 7/0632; H04L 43/16; H04J 11/00
See application file for complete search history.

(56) References Cited

U.S. PATENT DOCUMENTS

| | | |
|---|---|---|
| 5,963,165 A | 10/1999 | Das |
| 8,489,041 B2 | 7/2013 | Teillet et al. |
| 9,380,594 B1 * | 6/2016 | Malmirchegini ..... H04W 72/10 |
| 2014/0313859 A1 * | 10/2014 | Hald ..................... G01S 3/8083 367/138 |

* cited by examiner

*Primary Examiner* — Lester Kincaid
*Assistant Examiner* — William Wang

(57) ABSTRACT

A method of operating a multi-band wireless base station to optimize traffic management on the multiple frequency bands. The wireless base station determines Upper Side Lobe Suppression (USLS) levels and network loads on the frequency bands. The wireless base station receives a request from a User Equipment (UE) attachment. When the network loads on the frequency bands exceed corresponding network thresholds, then the wireless base station selects one of the frequency bands having a best one of the USLS levels, and attaches the UE to the selected one of the frequency bands.

20 Claims, 5 Drawing Sheets

WIRELESS COMMUNICATION SYSTEM TO OPTIMIZE TRAFFIC MANAGEMENT ON A MULTI-BAND WIRELESS BASE STATION

TECHNICAL BACKGROUND

Wireless communication systems exchange user data for User Equipment (UEs) to provide various data communication services. The UEs may be phones, computers, media players, intelligent machines, and the like. The data communication services might be audio or video calling, data messaging, media streaming, video conferencing, machine-to-machine data transfers, Internet access, or some other computerized information service. Wireless communication systems use wireless base stations to extend the range of their communication services and enable user mobility.

The wireless base stations may include radio frequency (RF) circuitry and processing systems capable of transmitting and receiving data. Some wireless base stations may transmit and receive data over multiple frequency bands. The use of multiple frequency bands permits a wireless service provider to communicate information to the UEs over a greater overall frequency band. However, because the frequencies often span over different ranges within the wireless spectrum, noise and interference may occur between the multiple frequencies. For example, a wireless signal is transmitted over a main beam, but the wireless signal radiates, which forms upper sideobes, lower sidelobes, and backlobes. The upper sidelobes are the main source of network interference. The signal of the upper sidelobes may be suppressed to reduce network interference. The level or amount of suppression is known as upper sidelobe suppression (USLS).

A wireless communication system may also employ Carrier Aggregation (CA). CA allows communication networks to use multiple resource blocks simultaneously for a UE. A UE uses CA to increase data throughput and transmission speeds to a wireless base station. Wireless communication systems can aggregate carriers over various frequency bands using Intra-Band Contiguous CA, Intra-Band Non-Contiguous CA, and Inter-Band CA. Intra-Band Contiguous CA uses component carriers that are in the same frequency band and are adjacent to each other. Intra-Band Non-Contiguous CA uses component carriers that are in the same frequency band but are not adjacent to each other. Inter-Band CA uses component carriers that are in different frequency bands. CA configurations for UEs may include a Primary Component Carrier (PCC) to exchange control and signaling data and one or more Secondary Component Carriers (SCCs) to exchange additional user data between the UE and the wireless base station.

Overview

Examples disclosed herein provide a system, method, hardware, and software to optimize traffic management on a multi-band wireless base station. The wireless base station determines Upper Side Lobe Suppression (USLS) levels and network loads on the frequency bands. The wireless base station receives a request from a User Equipment (UE) for attachment. When the network loads on the frequency bands exceed corresponding network thresholds, then the wireless base station selects one of the frequency bands having a best one of the USLS levels, and attaches the UE to the selected one of the frequency bands.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
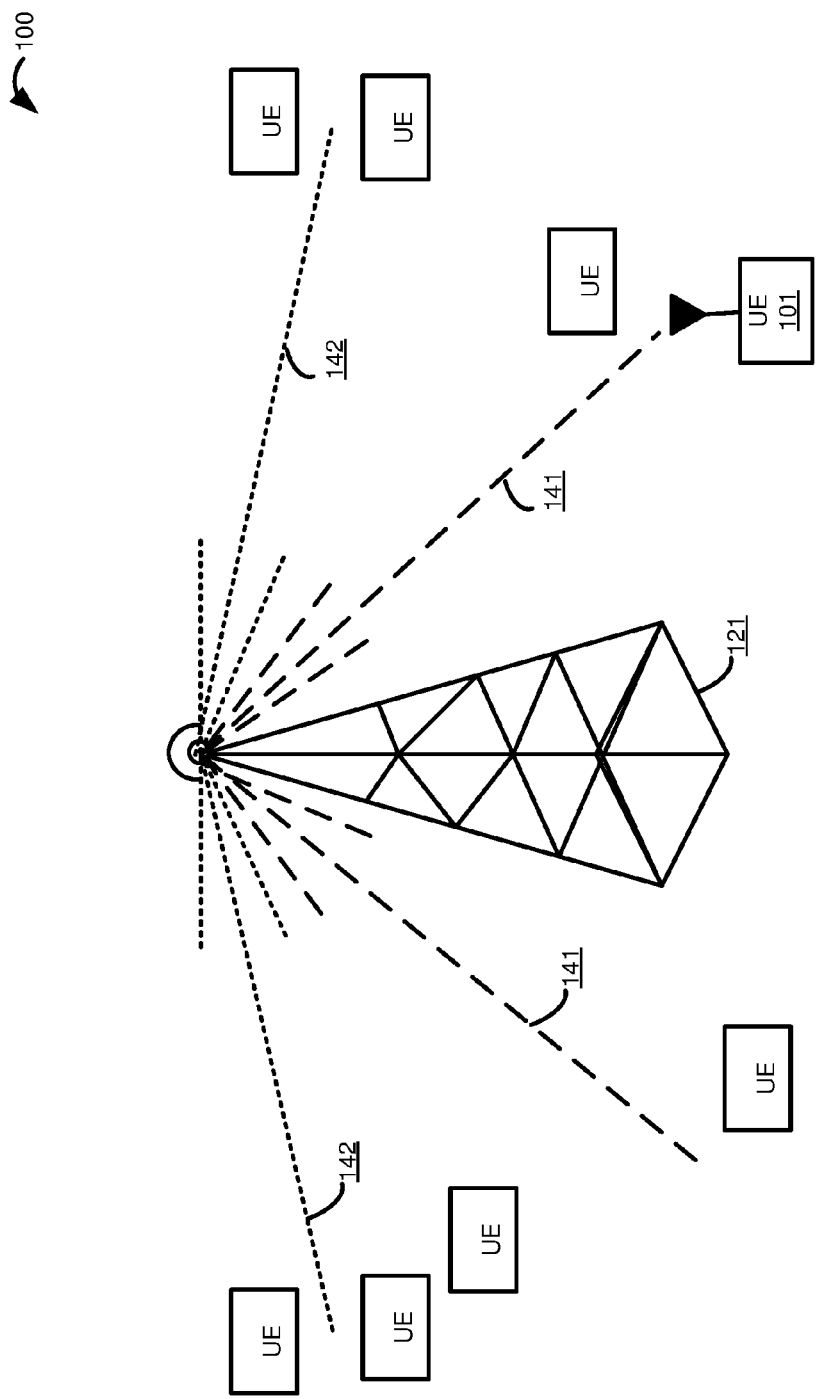
FIG. 1 illustrates a wireless communication system to optimize traffic management on a multi-band wireless base station.

FIG. 1 illustrates wireless communication system 100. Wireless communication system 100 includes UE 101, wireless base station 121 that broadcasts wireless signals over frequency bands 141-142. In addition to the main beam, frequency bands 141-142 include radiation shown with the shorter lines, above and below the main beam. Additional UEs are shown, but not numbered for clarity. In this example, the additional UEs are already attached to wireless base station 121, and are included to illustrate how the wireless base station is loaded.

In operation, wireless base station 121 determines Upper Side Lobe Suppression (USLS) levels and network loads on frequency bands 141-142. For example, wireless base station 121 may use vertical beamforming or base station tilt to minimize the interference caused by the upper sidelobe off the main beam of wireless signal. Due to antenna element spacing and other factors, the USLS levels may not be uniform or equal on all frequency bands. In other words, some of the frequency bands may have better USLS levels than others.

Wireless base station 121 may also determine the interference levels on the frequency bands. Some or all of the UEs may be capable of using Carrier Aggregation (CA) for exchanging data with wireless base station 121, so in addition, wireless base station 121 may determine the amount of CA usage on the frequency bands. For example, RF measurements to determine network load, interference, USLS levels, CA usage, etc. may be periodically taken or taken in response to an event, such as when a UE attaches or when a UE is initiating a handoff from one base station to another.

Wireless base station 121 receives a request from UE 101 for attachment. For example, UE 101 may transfer an RRC connection request. When the network loads on frequency bands 141-142 exceed corresponding network thresholds, then wireless base station 121 selects one of frequency bands 141-142 having a best one of the USLS levels, and attaches UE 101 to the selected one of frequency bands 141-142. In some examples, selecting a frequency band for attachment of UE 101 is triggered when the network load across all frequency bands is similar and interference levels on one or more of the frequency bands is above a threshold. In other examples, selecting a frequency band for UE 101 attachment may be triggered when the number of UEs using CA exceeds a threshold.

Examples of wireless base station include wireless access points, base transceiver stations, Long Term Evolution (LTE) evolved NodeBs (eNodeB). Examples of UEs include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

Figure 2:
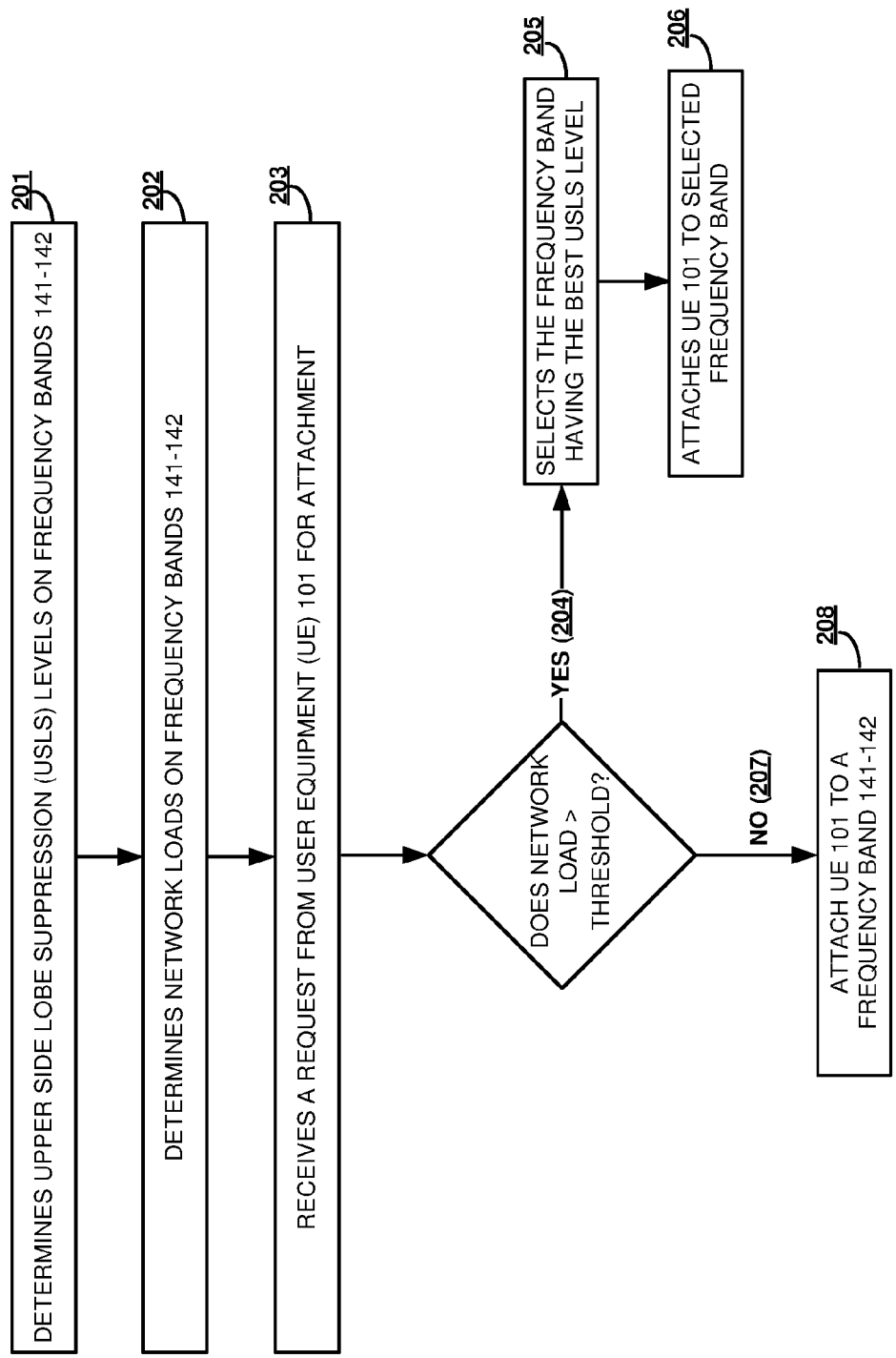
FIG. 2 illustrates the operation of the wireless communication system to optimize traffic management on the multi-band wireless base station.

FIG. 2 illustrates the operation of wireless communication system 100 to optimize traffic management on multi-band wireless base station 121. Wireless base station 121 determines USLS levels on frequency bands 141-142 (step 201). In some examples, USLS comprises vertical beamforming or base station tilt. Wireless base station 121 also determines network loads on frequency bands 141-142 (step 202). For example, wireless base station 121 determines the number of UEs on each frequency band. Wireless base station 121 may further determine whether the UEs are active or idle. In another example, wireless base station 121 may determine the number of UEs using Carrier Aggregation (CA) on each frequency band.

Wireless base station 121 receives a request from UE 101 for attachment (step 203). If the network loads on frequency bands 141-142 exceed corresponding network thresholds (step 204), then wireless base station 121 selects one of frequency bands 141-142 having a best one of the USLS levels (step 205), and attaches UE 101 to the selected one of frequency bands 141-142 (step 206).

In some examples, UE 101 attaches to the selected frequency band for a data communication session such as a video call. In other examples, UE 101 is using CA and is served with a Primary Component Carrier (PCC) and a Secondary Component Carrier (SCC) over the selected frequency band(s). In some examples, the selected frequency band is used to serve a UE with a PCC, the SCC may also be assigned to the selected frequency band, but could also be assigned to another frequency band.

If the network loads on frequency bands 141-142 does not exceed corresponding network thresholds (step 207), then wireless base station 121 attaches UE 101 to one of frequency bands 141-142 (step 208). For example, UE 101 attaches to the frequency band over which it transmitted the RRC connection message.

Figure 3:
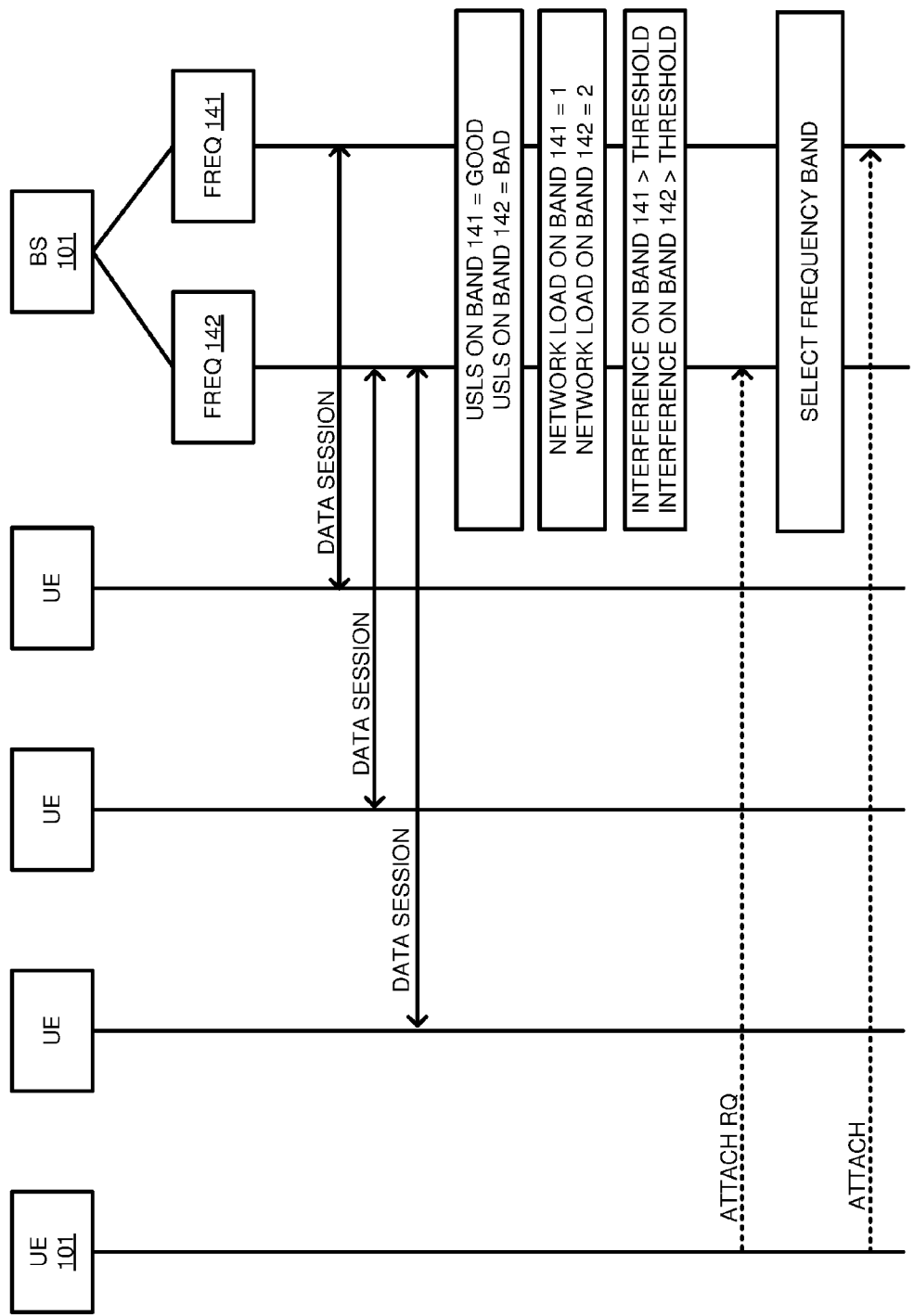
FIG. 3 illustrates the operation of the wireless communication system to optimize traffic management on the multi-band wireless base station.

FIG. 3 is a sequence diagram that illustrates the operation of wireless communication system 100 to optimize traffic management on multi-band wireless base station 121. Wireless base station 121 determines that USLS levels on frequency band 141 is good and USLS levels on frequency band 142 is bad. Wireless base station 121 also determines the network load on each frequency band. There are two UEs connected to wireless base station 121 over frequency band 142 and one UE connected over frequency band 141. Wireless base station 121 receives a request from UE 101 for attachment.

In this example, the network loads on frequency bands 141-142 exceed corresponding network thresholds, and wireless base station 121 selects frequency band 141, having a good USLS level over frequency band 142 having a bad USLS level, and attaches UE 101 to frequency band 141. In other examples, USLS levels may be measured using different criteria, such as high/medium/low, or other measurements suitable for measuring USLS levels. Although not required, selection could also be between channels of a frequency band rather than between frequency bands, if USLS varies between channels of the frequency band.

In other examples, wireless base station 121 determines that UE 101 is idle. Wireless base station 121 may reattach UE 101 to a frequency band with worst USLS levels to allow active users to be assigned to a frequency band with the best USLS. Although not required, wireless base station 121 may turn off frequency band(s) with high interference and move all UEs to another frequency band with less interference.

Figure 4:
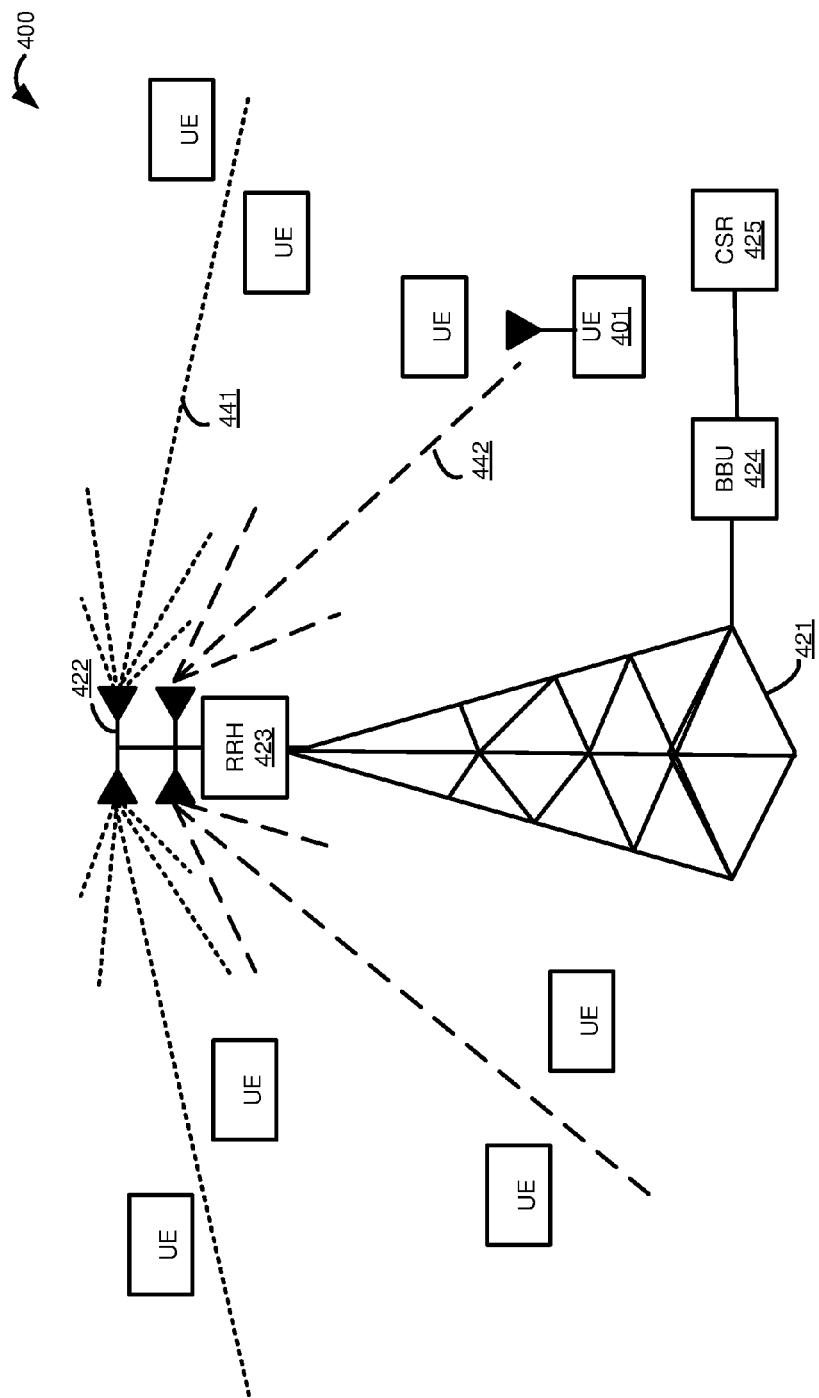
FIG. 4 illustrates a Long Term Evolution (LTE) communication system to optimize traffic management on a multi-band eNodeB.

FIG. 4 illustrates Long Term Evolution (LTE) communication system 400. LTE communication system 400 includes UE 401, eNodeB 421, antenna element 422, Remote Radio Head (RRH) 423, Baseband Unit (BBU) 424, and Cell Site Router (CSR) 425. Antenna element 422 broadcasts wireless signals over frequency bands 441-442. In addition to the main beam, frequency bands 441-442 include radiation shown with the shorter lines, above and below the main beam. Additional UEs are shown, but not numbered for clarity. Antenna element 422 may be connected to RRH 423 using coaxial cables. RRH 423 may be connected to BBU 424 using a Common Public Radio Interface (CPRI). BBU 424 and CSR 425 may be connected via an Ethernet connection.

In operation, eNodeB 421 determines USLS levels and network loads on frequency bands 441-442. eNodeB 421 may also determine interference levels on frequency bands 441-442. As illustrated, the upper sidelobe radiation from frequency band 442 may cause interference with frequency band 441. UE 401, or the other UEs may be capable of using CA for exchanging data with eNodeB 421, so in addition, eNodeB 421 may determine the amount of CA usage on the frequency bands. In some examples, RRH 423 may determine USLS levels and interference on frequency bands 441-442. In some examples, BBU 424 may include software that determines and monitors USLS levels, network load, and other network characteristics.

eNodeB 421 receives a request from UE 401 for attachment. For example, UE 401 may transfer an RRC connection request. When the network loads on frequency bands 441-442 exceed corresponding network thresholds, then eNodeB 421 selects one of frequency bands 441-442 having a best one of the USLS levels, and attaches UE 401 to the selected one of frequency bands 441-442. As illustrated, UE 401 sends the RRC connection request over frequency band 442. Frequency bands 441-442 are similar loaded. In this example, frequency band 441 may have better USLS levels, and eNodeB 421 selects frequency band 441 for UE attachment.

Figure 5:
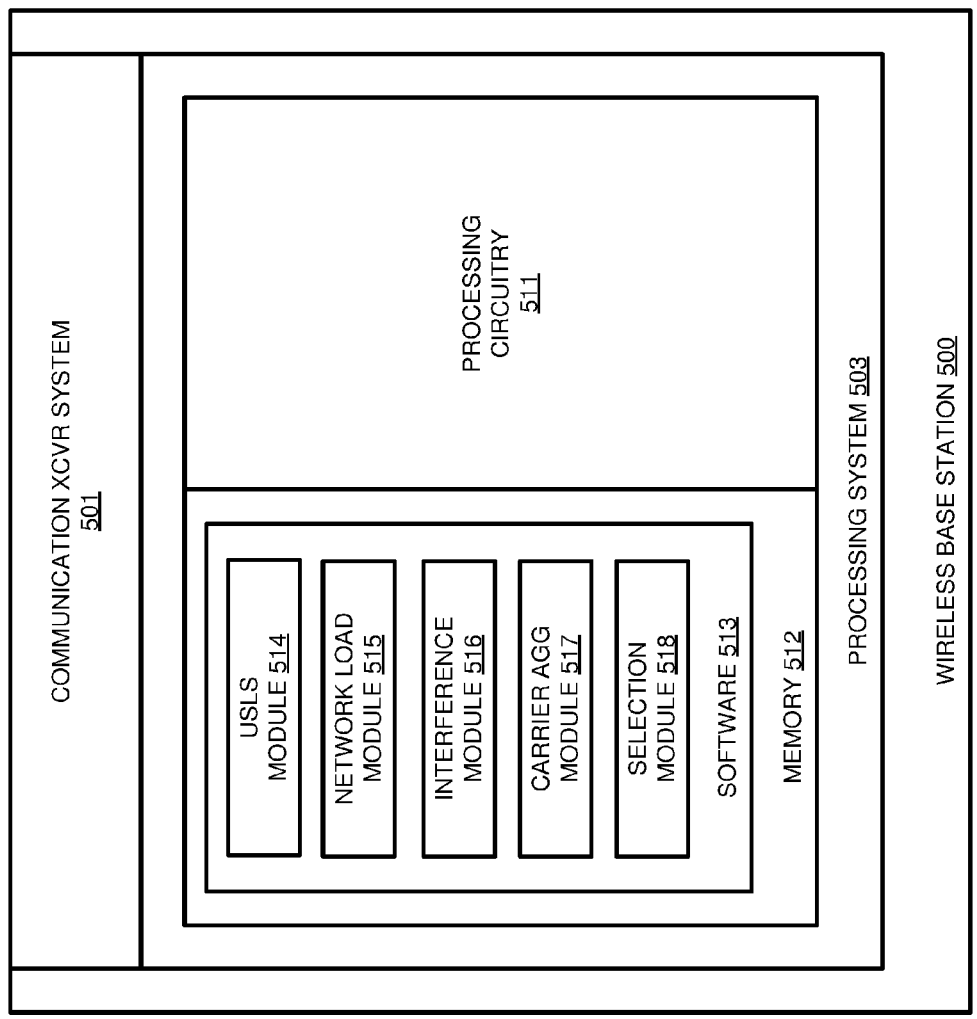
FIG. 5 illustrates an example of a wireless base station.

FIG. 5 illustrates an example of wireless base station 500 to optimize traffic management in a multi-band network. Wireless base station is an example of wireless base station 121 and eNodeB 421. Although these systems may use alternative configurations and operations. Wireless base station 500 comprises communication transceiver system 501 and processing system 503. Processing system 503 includes processing circuitry 511 and memory 512 that stores software 513. Software 513 comprises software modules 514-518.

Communication transceiver system 501 comprises components that communicate over communication links such as network cards, ports, RF transceivers, processing circuitry and software, or some other communication components. Communication transceiver system 501 may be configured to communicate over metallic, wireless, or optical links. Communication transceiver system 501 may be configured to use TDM, IP, Ethernet, optical networking, wireless protocols, communication signaling, or some other communication format—including combinations thereof. Communication transceiver system 501 may receive and transfer user communication data over the uplink and downlink communication channels, respectively.

Processing circuitry 511 comprises microprocessor and other circuitry that retrieves and executes operating software 513 from memory 512. Processing circuitry 511 may comprise a single device or could be distributed across multiple devices—including devices in different geographic areas. Processing circuitry 511 may be embedded in various types of equipment. Examples of processing circuitry 511 include central processing units, application specific processors, logic devices, and/or any type of computer processing devices—including combinations thereof.

Memory 512 comprises a non-transitory computer readable storage medium readable by processing system 503 and capable of storing software 513, such as a disk drive, flash drive, data storage circuitry, or some other hardware memory apparatus—including combinations thereof. Memory 512 can include volatile and/or non-volatile, removable and non-removable media implemented in any method or technology for storage of information, such as computer readable instructions, data structures, program modules, or other data—including combinations thereof. Memory 512 may comprise a single device or could be distributed across multiple devices—including devices in different geographic areas. Memory 512 may be embedded in various types of equipment. In some examples, a computer apparatus could comprise memory 512 and software 513.

Software 513 comprises computer programs, firmware, or some other form of machine-readable processing instructions. Software 513 may include an operating system, utilities, drivers, network interfaces, applications, or some other type of software. In this example, software 513 comprises USLS module 514, network load module 515, interference module 516, carrier aggregation module 517, and selection module 518. Although software 513 could have alternative configurations in other examples. Software 513 may be implemented in program instructions and may be executed by processing system 503. Software 513 may include additional processes, programs, or components, such as operating system software, database software, or application software—including combinations thereof. Software 513 may also comprise firmware or some other form of machine-readable processing instructions executable by processing system 503.

When executed, software 513 directs processing system 503 to operate as described herein to optimize traffic management on a multi-band wireless base station. In particular, USLS module 514 directs processing system 503 to configure antenna elements to maximize USLS and determine levels of USLS on the different frequency bands. Network load module 515 directs processing system 503 to determine the network load on the different frequency bands. Interference module 516 directs processing system 503 to determine the interference levels on the frequency bands. Carrier aggregation module 517 directs processing system 503 to perform carrier aggregation and determine the number of UEs using carrier aggregation on each frequency band. Selection module 518 directs processing system 503 to select the frequency band with the best USLS when network load and interference levels exceed respective thresholds.

Referring back to FIG. 1, UE 101 comprises Radio Frequency (RF) communication circuitry and an antenna. The RF communication circuitry typically includes an amplifier, filter, modulator, and signal processing circuitry. UE 101 may also include a user interface, memory device, software, processing circuitry, or some other communication components. UE 101 may be a telephone, computer, e-book, mobile Internet appliance, wireless network interface card, media player, game console, or some other wireless communication apparatus—including combinations thereof.

Wireless base station 121 comprises RF communication circuitry and an antenna. The RF communication circuitry typically includes an amplifier, filter, RF modulator, and signal processing circuitry. Wireless base station 121 may also comprise a router, server, memory device, software, processing circuitry, cabling, power supply, network communication interface, structural support, or some other communication apparatus. Wireless base station 121 could be a base station, eNodeB, Internet access node, telephony service node, wireless data access point, or some other wireless communication system—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless base station to exchange wireless user signals over frequency bands, the method comprising:
   determining Upper Side Lobe Suppression (USLS) levels on the frequency bands;
   determining network loads on the frequency bands;
   receiving a request from a User Equipment (UE) for attachment;
   when the network loads exceed corresponding network thresholds, then selecting one of the frequency bands having a best one of the USLS levels; and
   attaching the UE to the selected one of the frequency bands.

2. The method of claim 1 further comprising:
   determining interference levels on the frequency bands; and
   wherein selecting the one of the frequency bands when the network loads exceed the corresponding network thresholds comprises selecting the one of the frequency bands when the network loads exceed the corresponding network thresholds and when one of the interference levels exceeds an interference threshold.

3. The method of claim 1 further comprising:
determining an amount of Carrier Aggregation (CA) usage on the frequency bands; and
wherein selecting the one of the frequency bands when the network loads exceed the corresponding network thresholds comprises selecting the one of the frequency bands when the network loads exceed the corresponding network thresholds and when the amount of CA usage on the frequency bands exceeds a CA threshold.

4. The method of claim 1 wherein attaching the UE to the selected one of the frequency bands comprises serving the UE with a Carrier Aggregation (CA) Primary Component Carrier (PCC) over the selected on of the frequency bands.

5. The method of claim 1 wherein attaching the UE to the selected one of the frequency bands comprises serving the UE with a Carrier Aggregation (CA) Secondary Component Carrier (SCC) over the selected on of the frequency bands.

6. The method of claim 1 wherein USLS comprises vertical beamforming.

7. The method of claim 1 wherein USLS comprises base station tilt.

8. The method of claim 1 further comprising:
attaching another UE to one of the frequency bands; and
reattaching the other UE to the selected one of the frequency bands.

9. The method of claim 1 further comprising:
attaching another UE to one of the frequency bands; and
reattaching the other UE to the selected one of the frequency bands when the other UE enters idle mode.

10. The method of claim 1 wherein the wireless base station comprises a Long Term Evolution (LTE) evolved NodeB (eNodeB).

11. A wireless base station to exchange wireless user signals over frequency bands, the wireless base station comprising:
a data processing system configured to determine Upper Side Lobe Suppression (USLS) levels on the frequency bands;
the data processing system configured to determine network loads on the frequency bands;
a wireless transceiver configured to receive a request from a User Equipment (UE) for attachment;
the data processing system configured, when the network loads exceed corresponding network thresholds, to select one of the frequency bands having a best one of the USLS levels; and
the wireless transceiver configured to attach the UE to the selected one of the frequency bands.

12. The wireless base station of claim 11, further comprising:
the data processing system configured to determine interference levels on the frequency bands; and
the data processing system configured to select the one of the frequency bands when the network loads exceed the corresponding network thresholds and when one of the interference levels exceeds an interference threshold.

13. The wireless base station of claim 11 further comprising:
the data processing system configured to determine an amount of Carrier Aggregation (CA) usage on the frequency bands; and
the data processing system configured to select the one of the frequency bands when the network loads exceed the corresponding network thresholds and when the amount of CA usage on the frequency bands exceeds a CA threshold.

14. The wireless base station of claim 11 wherein the wireless transceiver is configured to serve the UE with a Carrier Aggregation (CA) Primary Component Carrier (PCC) over the selected on of the frequency bands.

15. The wireless base station of claim 11 wherein the wireless transceiver is configured to serve the UE with a Carrier Aggregation (CA) Secondary Component Carrier (SCC) over the selected on of the frequency bands.

16. The wireless base station of claim 11 wherein USLS comprises vertical beamforming.

17. The wireless base station of claim 11 wherein USLS comprises base station tilt.

18. The wireless base station of claim 11 further comprising:
the wireless transceiver configured to attach another UE to one of the frequency bands; and
the wireless transceiver configured to reattach the other UE to the selected one of the frequency bands.

19. The wireless base station of claim 11 further comprising:
the wireless transceiver configured to attach another UE to one of the frequency bands; and
the wireless transceiver configured to reattach the other UE to the selected one of the frequency bands when the other UE enters idle mode.

20. The wireless base station of claim 11 wherein the wireless base station comprises a Long Term Evolution (LTE) evolved NodeB (eNodeB).

* * * * *